United States Patent
Kamichi et al.

(10) Patent No.: US 8,275,512 B2
(45) Date of Patent: Sep. 25, 2012

(54) INPUT/OUTPUT CONTROLLER FOR SECONDARY BATTERY AND VEHICLE

(75) Inventors: Kensuke Kamichi, Aichi-gun (JP); Yoshiaki Kikuchi, Toyota (JP); Haruki Satoh, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 552 days.

(21) Appl. No.: 12/375,721

(22) PCT Filed: Sep. 26, 2007

(86) PCT No.: PCT/JP2007/069333
§ 371 (c)(1), (2), (4) Date: Nov. 13, 2009

(87) PCT Pub. No.: WO2008/056491
PCT Pub. Date: May 15, 2008

(65) Prior Publication Data
US 2010/0076647 A1     Mar. 25, 2010

(30) Foreign Application Priority Data
Nov. 8, 2006 (JP) .................................. 2006-303066

(51) Int. Cl.
B60L 11/18     (2006.01)
G01R 31/36     (2006.01)
G06F 7/00     (2006.01)

(52) U.S. Cl. ............... 701/36; 701/22; 702/63; 320/134

(58) Field of Classification Search .................... 701/36, 701/22, 1; 702/63; 320/134, 132
See application file for complete search history.

(56) References Cited

U.S. PATENT DOCUMENTS

| | | | | |
|---|---|---|---|---|
| 6,424,157 B1 * | 7/2002 | Gollomp et al. | ............. | 324/430 |
| 7,715,971 B2 * | 5/2010 | Okuda et al. | .................... | 701/93 |
| 2003/0097225 A1 * | 5/2003 | Teruo | ............................. | 702/63 |
| 2005/0075766 A1 * | 4/2005 | Kobayashi et al. | ............. | 701/22 |
| 2006/0021808 A1 * | 2/2006 | McGee et al. | ............... | 180/65.2 |
| 2006/0021809 A1 * | 2/2006 | Xu et al. | ...................... | 180/65.2 |
| 2009/0105924 A1 * | 4/2009 | Kamichi et al. | ................ | 701/99 |

FOREIGN PATENT DOCUMENTS

| | | | |
|---|---|---|---|
| JP | 11-136875 | A | 5/1999 |
| JP | 11-289753 | A | 10/1999 |
| JP | 2002-122642 | A | 4/2002 |
| JP | 2004-159422 | A | 6/2004 |
| JP | 2004-172058 | A | 6/2004 |
| JP | 2004-222427 | A | 8/2004 |
| JP | 2005-6461 | A | 1/2005 |
| JP | 2005-039989 | A | 2/2005 |
| JP | 2005-312128 | A | 11/2005 |
| JP | 2006-006073 | A | 1/2006 |

* cited by examiner

Primary Examiner — Tan Q Nguyen
(74) Attorney, Agent, or Firm — Kenyon & Kenyon LLP

(57) ABSTRACT

An input/output controller for a secondary battery installed in a hybrid vehicle includes a temperature sensor detecting a battery temperature of a battery, a voltage sensor detecting battery voltage of battery, and a control unit for receiving temperature detected by temperature sensor and battery voltage detected by voltage sensor and setting a limit value of electric power to be inputted to or outputted from battery. Control unit changes a change ratio of the limit value to be inputted or outputted relative to battery voltage in accordance with temperature.

8 Claims, 6 Drawing Sheets

INPUT/OUTPUT CONTROLLER FOR SECONDARY BATTERY AND VEHICLE

This is a 371 national phase application of PCT/JP2007/069333 filed 26 Sep. 2007, claiming priority to Japanese Patent Application No. 2006-303066 filed 08 Nov. 2006, the contents of which are incorporated herein by reference.

TECHNICAL FIELD

The present invention relates to an input/output controller for a secondary battery and a vehicle.

BACKGROUND ART

Recently, a hybrid vehicle and an electric vehicle are drawing a great deal of attention as an eco-friendly vehicle. Then, the hybrid vehicle is partially put into a practical use.

This hybrid vehicle is a vehicle having a DC power source, an inverter and a motor driven by the inverter as a power source in addition to a conventional engine. That is, while the power source is obtained by driving the engine, direct voltage from the DC power source is converted into alternating voltage by the inverter and the power source is obtained by rotating the motor by the converted alternating voltage. The electric vehicle is a vehicle having a DC power source, an inverter and a motor driven by the inverter as a power source.

In general, a secondary battery is installed in the hybrid vehicle or the electric vehicle as the DC power source. By demonstrating a performance of the secondary battery more, a performance of the vehicle can be improved.

For example, Japanese Patent Laying-Open No. 2005-039989 discloses an output management device for a secondary battery. In a case where the secondary battery is required to output exceeding a rated output, this output management device sets a quantity of the output and a duration time for the output based on a temperature of the secondary battery.

In general, internal resistance of a battery has dependence on the temperature. For example, the internal resistance of the battery is increased as a temperature around the battery is lowered. When the internal resistance of the battery is increased, a change in battery voltage relative to a change in electric power inputted to or outputted from the battery is increased. When the change in the battery voltage is increased, the battery voltage may exceed an upper limit value of a use range or fall below a lower limit value of the use range. However, Japanese Patent Laying-Open No. 2005-039989 does not particularly disclose such a problem.

DISCLOSURE OF THE INVENTION

An object of the present invention is to provide an input/output controller for a secondary battery capable of properly controlling battery voltage in accordance with a battery temperature, and a vehicle provided with the above device.

In summary, the present invention provides an input/output controller for a secondary battery, including a temperature sensing unit for sensing a battery temperature of the secondary battery, a voltage sensing unit for sensing battery voltage of the secondary battery, and a setting unit for receiving the battery temperature sensed by the temperature sensing unit and the battery voltage sensed by the voltage sensing unit and setting a limit value of electrical power to be inputted to or outputted from the secondary battery. The setting unit changes a change ratio of the limit value relative to the battery voltage in accordance with the battery temperature.

Preferably, the setting unit includes an operation unit for performing control operation based on a deviation between target voltage of the secondary battery and the battery voltage. The operation unit changes control gain used in the control operation in accordance with the battery temperature. The setting unit further includes an initial value setting unit for setting an initial value of the limit value, and a limit value determining unit for determining the limit value based on the initial value and an operation result of the operation unit.

More preferably, the operation unit determines the control gain so that the control gain is decreased as the battery temperature is lowered.

More preferably, the control operation is proportional integral operation. The control gain includes proportional gain and integral gain. The operation unit has a coefficient setting unit, a proportional operation unit, an integral operation unit and an adding unit. The coefficient setting unit sets first and second coefficients in accordance with the battery temperature. The proportional operation unit sets the proportional gain by multiplying the first coefficient by fixed first gain not in accordance with the battery temperature and operates a proportional value of the deviation with using the proportional gain. The integral operation unit sets the integral gain by multiplying the second coefficient by fixed second gain not in accordance with the battery temperature and operates an integral value of the deviation with using the integral gain. The adding unit adds the proportional value and the integral value.

In accordance with another aspect of the present invention, a vehicle includes a secondary battery, and an input/output controller for controlling an input and an output of the secondary battery. The input/output controller includes a temperature sensing unit for sensing a battery temperature of the secondary battery, a voltage sensing unit for sensing battery voltage of the secondary battery, and a setting unit for receiving the battery temperature sensed by the temperature sensing unit and the battery voltage sensed by the voltage sensing unit and setting a limit value of electrical power to be inputted to or outputted from the secondary battery. The setting unit changes a change ratio of the limit value relative to the battery voltage in accordance with the battery temperature.

Preferably, the setting unit has an operation unit for performing control operation based on a deviation between target voltage of the secondary battery and the battery voltage. The operation unit changes control gain used in the control operation in accordance with the battery temperature. The setting unit further has an initial value setting unit for setting an initial value of the limit value, and a limit value determining unit for determining the limit value based on the initial value and an operation result of the operation unit.

More preferably, the operation unit determines the control gain so that the control gain is decreased as the battery temperature is lowered.

More preferably, the control operation is proportional integral operation. The control gain includes proportional gain and integral gain. The operation unit has a coefficient setting unit, a proportional operation unit, an integral operation unit and an adding unit. The coefficient setting unit sets first and second coefficients in accordance with the battery temperature. The proportional operation unit sets the proportional gain by multiplying the first coefficient by fixed first gain not in accordance with the battery temperature and operates a proportional value of the deviation with using the proportional gain. The integral operation unit sets the integral gain by multiplying the second coefficient by fixed second gain not in accordance with the battery temperature and operates an integral value of the deviation with using the integral gain.

The adding unit adds the proportional value and the integral value.

Therefore, according to the present invention, the battery voltage can be properly controlled in accordance with the battery temperature.

BEST MODES FOR CARRYING OUT THE INVENTION

Figure 1:
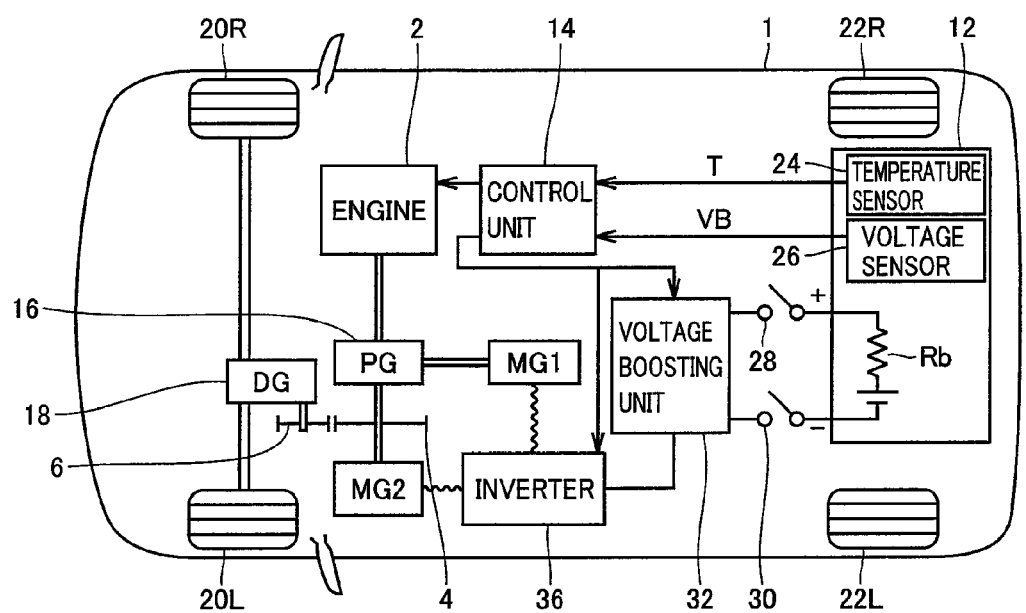
FIG. 1 is a schematic diagram showing a configuration of a vehicle provided with an input/output controller for a secondary battery according to the present embodiment.

Hereinafter, an embodiment of the present invention will be described in detail with reference to the drawings. It should be noted that the same or corresponding parts in the drawings are given the same reference symbols and description thereof will not be repeated.

FIG. 1 is a schematic diagram showing a configuration of a vehicle provided with an input/output controller for a secondary battery according to the present embodiment.

With reference to FIG. 1, a hybrid vehicle 1 includes front wheels 20R and 20L, rear wheels 22R and 22L, an engine 2, a planetary gear 16, a differential gear 18 and gears 4 and 6.

Hybrid vehicle 1 further includes a battery 12 arranged on the rear side of the vehicle, a voltage boosting unit 32 for boosting voltage of direct current power outputted by battery 12, an inverter 36 for supplying or receiving the direct current power to or from voltage boosting unit 32, a motor generator MG1 for receiving mechanical power of engine 2 via planetary gear 16 and generating electric power, and a motor generator MG2 having a rotation shaft connected to planetary gear 16. Inverter 36 is connected to motor generators MG1 and MG2 so as to convert alternating current power and the direct current power from a voltage boosting circuit.

Planetary gear 16 has first to third rotation shafts. The first rotation shaft is connected to engine 2, the second rotation shaft is connected to motor generator MG1, and the third rotation shaft is connected to motor generator MG2.

Gear 4 is attached to this third rotation shaft. By driving gear 6, this gear 4 transmits the mechanical power to differential gear 18. Differential gear 18 transmits the mechanical power received from gear 6 to front wheels 20R and 20L, and also transmits rotation force of front wheels 20R and 20L to the third rotation shaft of the planetary gear via gears 6 and 4.

Planetary gear 16 plays a role of dividing the mechanical power among engine 2 and motor generators MG1 and MG2. That is, when rotation of two of three rotation shafts of planetary gear 16 is determined, rotation of the remaining one rotation shaft is inevitably determined. Therefore, while engine 2 is operated in the most efficient area, electric generating capacity of motor generator MG1 is controlled so as to drive motor generator MG2. Thereby, vehicle speed is controlled and a wholly energy-efficient vehicle is realized.

Battery 12 serving as a DC power source is, for example, formed by a nickel hydride secondary battery, a lithium ion secondary battery or the like for supplying the direct current power to voltage boosting unit 32 and being charged by the direct current power from voltage boosting unit 32.

Voltage boosting unit 32 boosts direct voltage received from battery 12, and supplies the boosted direct voltage to inverter 36. Inverter 36 converts the supplied direct voltage into alternating voltage, and controls drive of motor generator MG1 at the time of starting the engine. After starting the engine, the alternating current power generated by motor generator MG1 is converted into the direct current by inverter 36 and converted into voltage suitable for charging battery 12 by voltage boosting unit 32 so that battery 12 is charged.

Inverter 36 drives motor generator MG2. Motor generator MG2 assists engine 2 and drives front wheels 20R and 20L. At the time of braking, the motor generator performs a regenerating operation and converts rotation energy of the wheels into electric energy. The obtained electric energy is returned to battery 12 via inverter 36 and voltage boosting unit 32.

System main relays 28 and 30 are provided between voltage boosting unit 32 and battery 12, and high voltage is cut off at the time of not operating the vehicle.

Battery 12 includes internal resistance Rb. In general, internal resistance Rb has dependency on a temperature. For example, internal resistance Rb is increased as the temperature is lowered.

Hybrid vehicle 1 further includes a temperature sensor 24 and a voltage sensor 26 attached to battery 12, and a control unit 14 for controlling engine 2, inverter 36 and voltage boosting unit 32 in accordance with outputs of temperature sensor 24 and voltage sensor 26. Temperature sensor 24 detects and transmits a temperature T of the battery to control unit 14. Voltage sensor 26 detects and transmits voltage between terminals of battery 12 (battery voltage VB) to control unit 14.

Control unit 14 receives temperature T and battery voltage VB and sets a limit value of electric power to be inputted to or outputted from battery 12. Control unit 14 changes a change ratio of the limit value relative to a change in battery voltage VB in accordance with temperature T.

Specifically, control unit 14 decreases the change ratio of the limit value relative to the change in battery voltage VB as temperature T is lowered, and increases the change ratio of the limit value relative to the change in battery voltage VB as temperature T is raised. Thereby, even when the temperature of battery 12 is changed, battery voltage VB can be brought closer to target voltage.

Figure 2:
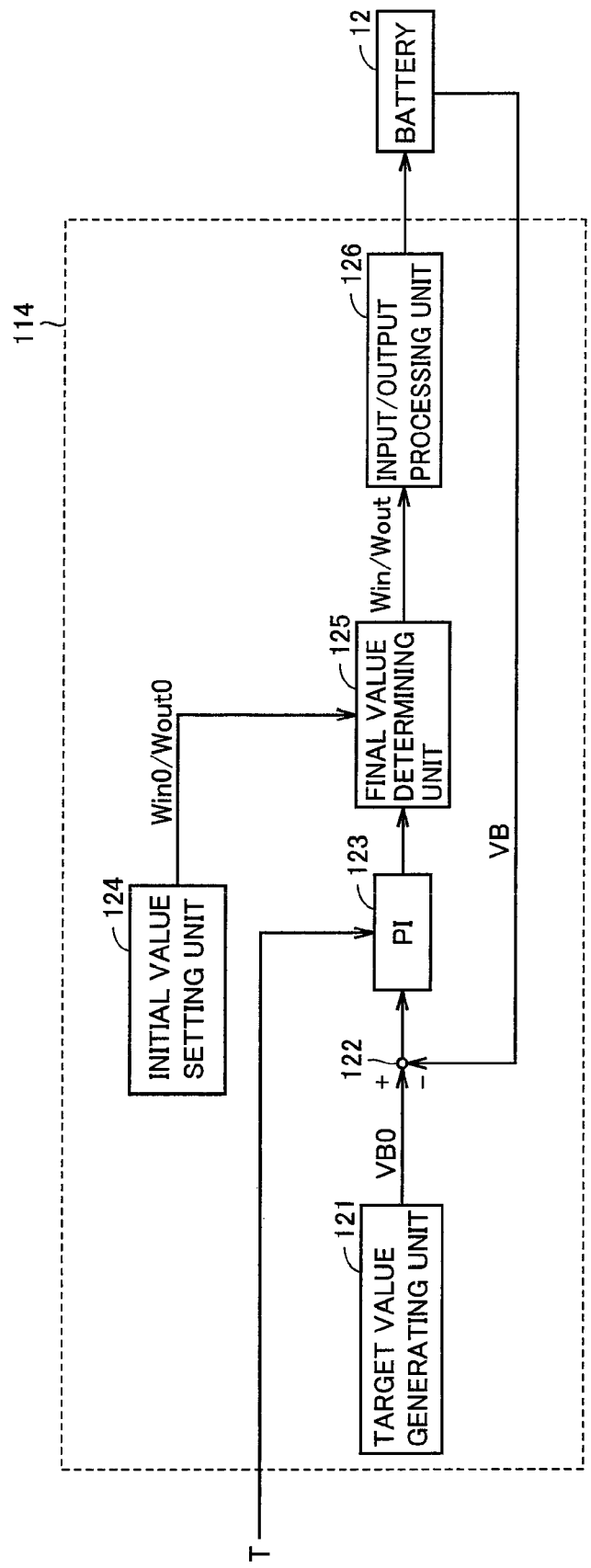
FIG. 2 is a block diagram of an input/output control system of a battery 12 included in a control unit 14 of FIG. 1.

FIG. 2 is a block diagram of an input/output control system of battery 12 included in control unit 14 of FIG. 1. It should be noted that the input/output control system shown in FIG. 2 may be realized by software or by hardware.

With reference to FIG. 2, an input/output control system 114 in the present embodiment forms a feedback control system. Input/output control system 114 includes a target value generating unit 121, a subtracting unit 122, a PI control unit 123, an initial value setting unit 124, a final value determining unit 125, and an input/output processing unit 126.

Target value generating unit 121 generates and outputs target voltage VB0 serving as a target value of the voltage of battery 12. Target voltage VB0 may be a fixed value or, for example, a value to be set in accordance with a deterioration state of battery 12.

Subtracting unit 122 subtracts battery voltage VB from target voltage VB0 and outputs a subtracting result thereof to PI control unit 123.

PI control unit 123 performs proportional integral operation taking a deviation between target voltage VB0 and battery voltage VB as an input and outputs an operation result thereof to final value determining unit 125. PI control unit 123 changes control gain (hereinafter also referred to as the "feedback gain") in accordance with temperature T. A configuration of PI control unit 123 will be described later.

Initial value setting unit 124 sets an initial value of a limit value Win of electric power inputted to battery 12 (initial value Win0) and an initial value of a limit value Wout of electric power outputted from battery 12 (initial value Wout0). A method of setting initial values Win0 and Wout0 is not particularly limited. For example, initial value setting unit 124 may preliminarily store a map for correspondence between battery voltage VB and initial value Win0 and a map for correspondence between battery voltage VB and initial value Wout0. In this case, initial value setting unit 124 determines initial value Win0 or initial value Wout0 based on battery voltage VB detected by voltage sensor 26 of FIG. 1.

Final value determining unit 125 receives initial value Win0 from initial value setting unit 124 and the operation result of PI control unit 123. Final value determining unit 125 compensates initial value Win0 with using the operation result of PI control unit 123 and determines limit value Win of the electric power to be inputted to battery 12.

Similarly, final value determining unit 125 receives initial value Wout0 from initial value setting unit 124 and the operation result of PI control unit 123. Final value determining unit 125 compensates initial value Wout0 with using the operation result of PI control unit 123 and determines limit value Wout of the electric power to be inputted to battery 12. That is, PI control unit 123 changes a compensation amount of limit value Win and a compensation amount of limit value Wout of the electric power in accordance with the temperature.

Input/output processing unit 126 charges battery 12 based on limit value Win given from final value determining unit 125. Electricity is discharged from battery 12 based on limit value Wout given from final value determining unit 125. Input/output processing unit 126 operates voltage boosting unit 32, inverter 36 and engine 2 shown in FIG. 1 so that battery 12 is charged or the electric power is discharged from battery 12.

Figure 3:
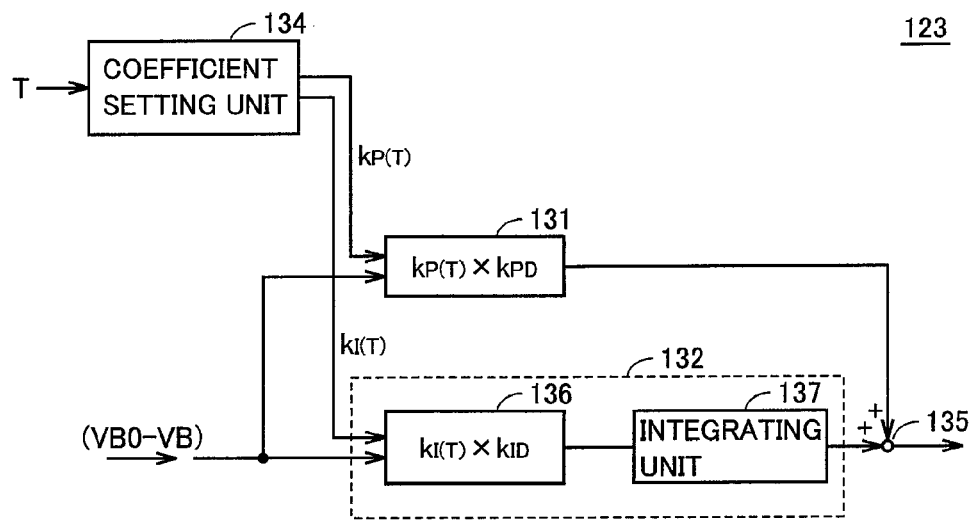
FIG. 3 is a diagram showing a configuration of a PI control unit 123 of FIG. 2.

FIG. 3 is a diagram showing a configuration of PI control unit 123 of FIG. 2.

With reference to FIG. 3, PI control unit 123 includes a proportional operation unit 131, an integral operation unit 132, a coefficient setting unit 134, and an adding unit 135. Integral operation unit 132 includes an amplifying unit 136 and an integrating unit 137.

Proportional operation unit 131 operates a proportional value of the deviation (VB0−VB) with using proportional gain (kP(T)×kPD) determined by the product of a coefficient kP(T) to be inputted and predetermined gain kPD. Integral operation unit 132 operates an integral value of the deviation (VB0−VB) with using integral gain (kI(T)×kID) determined by the product of a coefficient kI(T) to be inputted and predetermined gain kID.

kPD and kID are gain when a battery temperature is a predetermined temperature (such as −30° C.) (hereinafter, referred to as the "default"). kP(T) and kI(T) are coefficients changed in accordance with the temperature. Therefore, the proportional gain in proportional operation unit 131 and the integral gain in integral operation unit 132 are changed in accordance with the temperature.

Amplifying unit 136 amplifies the deviation (VB0−VB) with using integral gain (kI(T)×kID). Integrating unit 137 time-integrates an output of amplifying unit 136. It should be noted that integrating unit 137 may be provided in a previous stage of amplifying unit 136.

Coefficient setting unit 134 changes coefficients kP(T) and kI(T) in accordance with temperature T. For example, coefficient setting unit 134 refers to a map shown in FIG. 4 so as to determine coefficients kP(T) and kI(T). Coefficient setting unit 134 outputs coefficients kP(T) and kI(T) to proportional operation unit 131 and integral operation unit 132 respectively.

Adding unit 135 adds an operation result (proportional value) of proportional operation unit 131 and an operation result (integral value) of integral operation unit 132. An operation result in adding unit 135 is an output of PI control unit 123.

Figure 4:
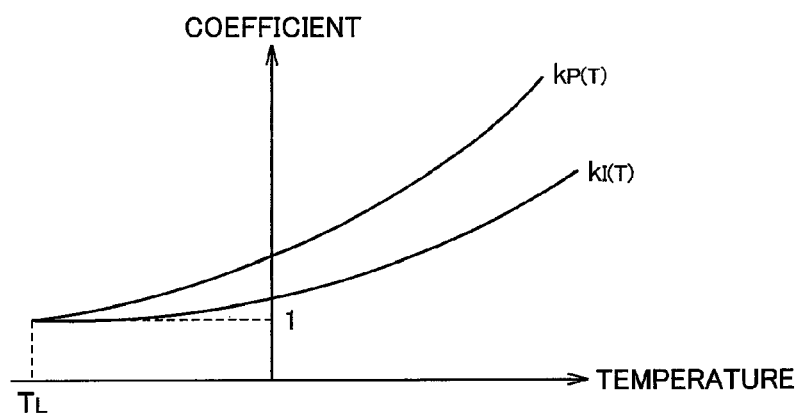
FIG. 4 is a diagram for illustrating a map referred by a coefficient setting unit 134 of FIG. 3.

FIG. 4 is a diagram for illustrating a map referred by coefficient setting unit 134 of FIG. 3.

With reference to FIG. 4, when the battery temperature is a predetermined value TL (−30° C. in the above example), both coefficients kP(T) and kI(T) are 1. As the battery temperature is raised from predetermined value TL, coefficients kP(T) and kI(T) are increased. It should be noted that a change ratio of coefficients kP(T) and kI(T) relative to a change in the temperature is not limited to an inclination of a curve shown in FIG. 4 but properly determined in accordance with a characteristic of battery 12, a response property in the feedback control system or the like.

Next, an effect by the input/output controller of the present embodiment will be described. It should be noted that hereinafter, a case where the electric power is taken out from battery 12 will be mainly described.

Figure 5:
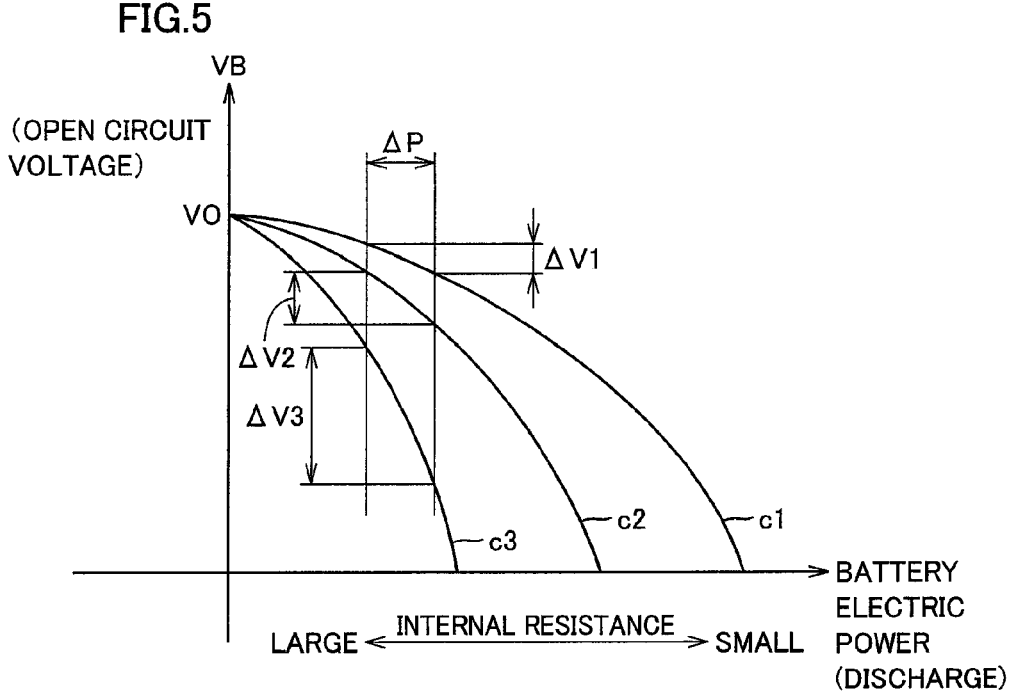
FIG. 5 is a diagram for illustrating a relationship between discharged electric power of battery 12 and battery voltage VB.

FIG. 5 is a diagram for illustrating a relationship between discharged electric power of battery 12 and battery voltage VB.

With reference to FIG. 5, curves c1 to c3 are curves showing the relationship between the electric power of battery 12 at the time of electric discharge and battery voltage VB. Curves c1 and c3 show the relationship between the discharged electric power of battery 12 and battery voltage VB in a state where the internal resistance of the electric battery is relatively low and in a state where the internal resistance of the electric battery is relatively high respectively. Curve c2 shows the relationship between the discharged electric power of battery 12 and battery voltage VB in a middle state between the state where the internal resistance of the electric battery is relatively low and the state where the internal resistance of the electric battery is relatively high.

In any of curves c1 to c3, as the discharged electric power is increased, battery voltage VB is lowered from voltage V0 serving as open circuit voltage.

Next, the change in the temperature in a minute change amount of electric power P relative to a minute change amount of battery voltage VB will be described. When electromotive force of battery 12 shown in FIG. 1 is Eo, a resistance value of internal resistance Rb is R, and current passing through battery 12 is I, battery voltage VB is represented as (Eo−I×R). Electric power P outputted from battery 12 is represented as I×VB. Therefore, a relationship shown in the following equation (1) is established with regard to electric power P and battery voltage VB.

$$P = \{(Eo - VB)\}/R \times VB \quad (1)$$

Here, the change amount of electric power P relative to the change amount of battery voltage VB is dP/dV. dP/dV is equal to a result of differentiating electric power P shown in equation (1) with respect to battery voltage VB. Therefore, dP/dV is represented as the following equation (2).

$$dP/dV = (Eo - 2VB)/R \quad (2)$$

In general, as the battery temperature is lowered, the internal resistance of the battery is increased. That is, in a case where (Eo−VB) is fixed, as the battery temperature is lowered, dP/dV is decreased. Conversely, this indicates that as the battery temperature is lowered, (dV/dP) is increased.

Curves c1 to c3 show a relationship of dV/dP mentioned above. In FIG. 5, the minute change amount of electric power P is ΔP. In curves c1 to c3, the change amounts of battery voltage VB corresponding to ΔP are ΔV1, ΔV2 and ΔV3 respectively. A relationship of ΔV1<ΔV2<ΔV3 is established with regard to ΔV1, ΔV2 and ΔV3. Therefore, a relationship of (ΔV1/ΔP)<(ΔV2/ΔP)<(ΔV3/ΔP) is established. This indicates that as the temperature of battery 12 is lowered, sensitivity of battery voltage VB is increased relative to the change in electric power P.

Figure 6:
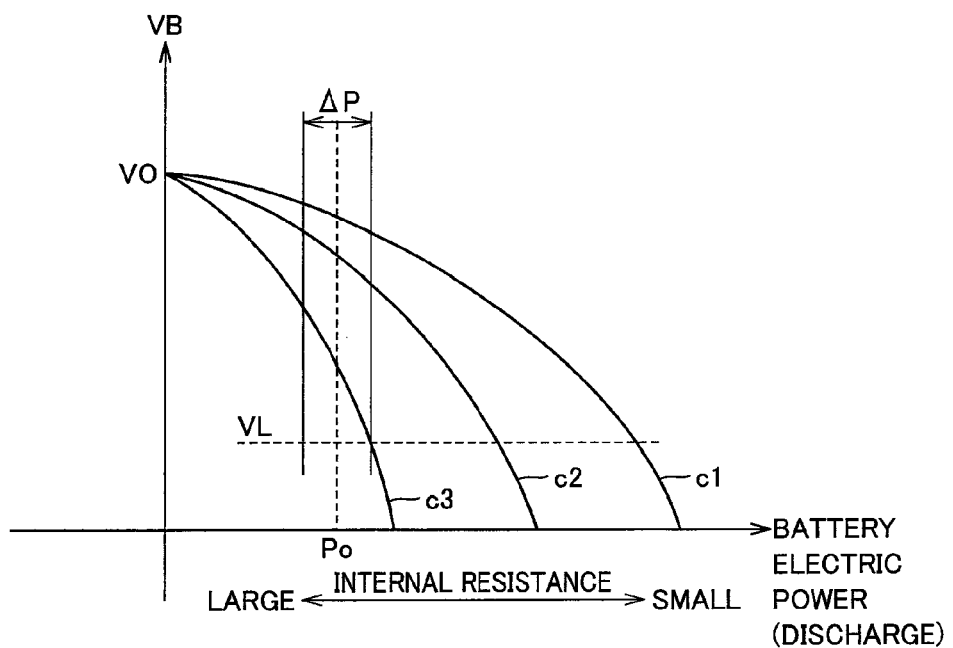
FIG. 6 is a diagram for illustrating a possible problem caused in a case where feedback gain in PI control unit 123 of FIG. 2 is set to be constant with a temperature.

FIG. 6 is a diagram for illustrating a possible problem caused in a case where the feedback gain in PI control unit 123 of FIG. 2 is set to be constant with the temperature.

With reference to FIG. 6, provided that the discharged electric power of the battery is controlled so that the discharged electric power of the battery is changed by ΔP around Po. Here, voltage VL is a lower limit value of battery voltage VB determined based on, for example, a performance of the battery, a use state (deterioration state) of the battery or the like. By maintaining battery voltage VB higher than voltage VL, for example, over-discharge of the battery can be prevented.

In curves c1 and c2, even when the discharged electric power of the battery is changed by ΔP, battery voltage VB is always higher than voltage VL. On the other hand, in curve c3, the change in battery voltage VB relative to the change in the discharged electric power is large. Therefore, when the discharged electric power of the battery is changed by ΔP, battery voltage VB is lower than voltage VL.

Figure 7:
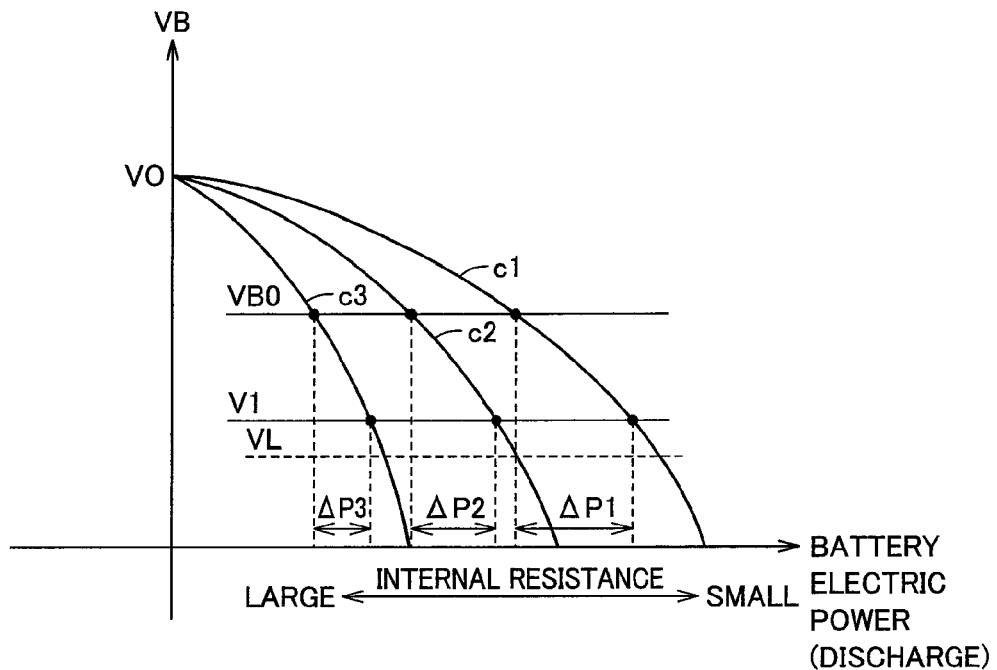
FIG. 7 is a diagram for illustrating an effect in a case where the feedback gain in PI control unit 123 of FIG. 2 is changed in accordance with the temperature.

FIG. 7 is a diagram for illustrating an effect in a case where the feedback gain in PI control unit 123 of FIG. 2 is changed in accordance with the temperature.

With reference to FIG. 7, ΔP1, ΔP2 and ΔP3 show change amounts of the discharged electric power of battery 12 when battery voltage VB is changed from target voltage V130 to voltage V1 in curves c1 to c3 respectively.

With reference to FIGS. 7 and 2, in a case where the internal resistance is small, that is, in a case where the battery temperature is high, the feedback gain in PI control unit 123 is set to be large. In this case, the feedback gain is set so that the discharged electric power of the battery is changed along curve c1 so to speak.

In the case where the battery temperature is high, the internal resistance of the battery is decreased. Therefore, the change in battery voltage VB relative to the change in outputted electric power of the battery is small. In the present embodiment, in the case where the battery temperature is high, the feedback gain is increased so as to increase the compensation amount of limit value Wout. Thereby, the change in limit value Wout can be increased. Even when the change in battery voltage VB is small, the response property of input/output control system 114 can be enhanced. Therefore, battery voltage VB can be brought closer to target voltage VB0 for a short time.

On the other hand, in a case where the internal resistance is large, that is, in a case where the battery temperature is low, the feedback gain in PI control unit 123 is set to be small. In the case where the battery temperature is low, the change in battery voltage VB relative to the change in the outputted electric power of the battery is large. Therefore, the feedback gain relative to the deviation between target voltage VB0 and battery voltage VB (that is, VB0−VB) is increased more than necessary, for example, overshoot of battery voltage VB, undershoot of battery voltage VB, hunting of battery voltage VB or the like may be caused.

In the present embodiment, in the case where the battery temperature is low, the feedback gain is decreased. Thereby, the compensation amount of limit value Wout is decreased and the change in limit value Wout relative to the change in battery voltage VB can be decreased. Thereby, since fluctuation of battery voltage VB can be decreased, the overshoot, the undershoot, the hunting and the like of battery voltage VB can be prevented.

As a result, in the present embodiment, in a case where the electric power is taken out from the battery, the electric power to be outputted from the battery can be controlled so that the lower limit value of battery voltage VB (voltage V1) is higher than voltage VL. That is, the voltage of the battery can be properly controlled in accordance with the battery temperature.

Figure 8:
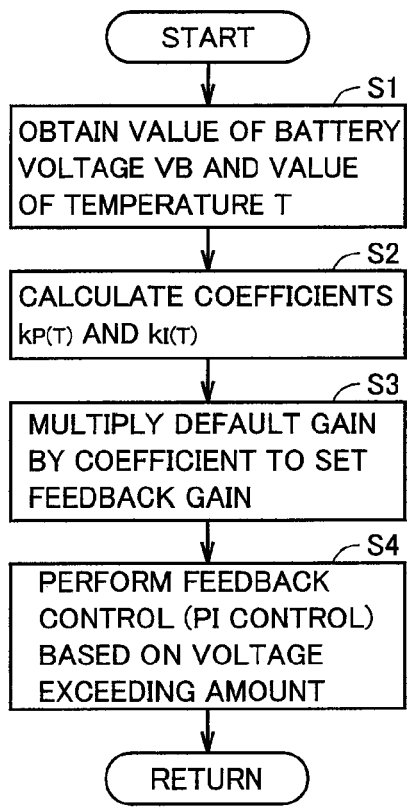
FIG. 8 is a flowchart showing processing performed by an input/output control system 114 shown in FIG. 2.

FIG. 8 is a flowchart showing processing performed by input/output control system 114 shown in FIG. 2. The processing of this flowchart is executed whenever a predetermined condition is met, or at a fixed intervals.

With reference to FIGS. 8 and 2, input/output control system 114 obtains a value of battery voltage VB and a value of temperature T (Step S1). Next, with reference to FIGS. 8 and 3, processing of Steps S2 and S3 will be described.

In Step S2, coefficient setting unit 134 calculates coefficients kP(T) and kI(T) based on temperature T and the map (refer to FIG. 4).

In Step S3, PI control unit 123 sets the feedback gain by multiplying default gain by the coefficient. Specifically, in Step S3, proportional operation unit 131 sets the proportional gain by multiplying the default gain (gain kPD) by coefficient kP(T). Similarly, in Step S3, integral operation unit 132 sets the integral gain by multiplying the default gain (gain kID) by coefficient kI(T).

With reference to FIGS. 8 and 2 again, processing of Step S4 will be described. In Step S4, input/output control system 114 executes feedback control (PI control) based on a voltage exceeding amount (that is, deviation (VB0−VB)). When the processing of Step S4 is finished, the entire processing is returned to Step S1 again.

It should be noted that not only in a case where the electric power is outputted from the battery, but also in a case where the electric power is inputted to the battery, the input/output controller of the present embodiment can be applied.

Figure 9:
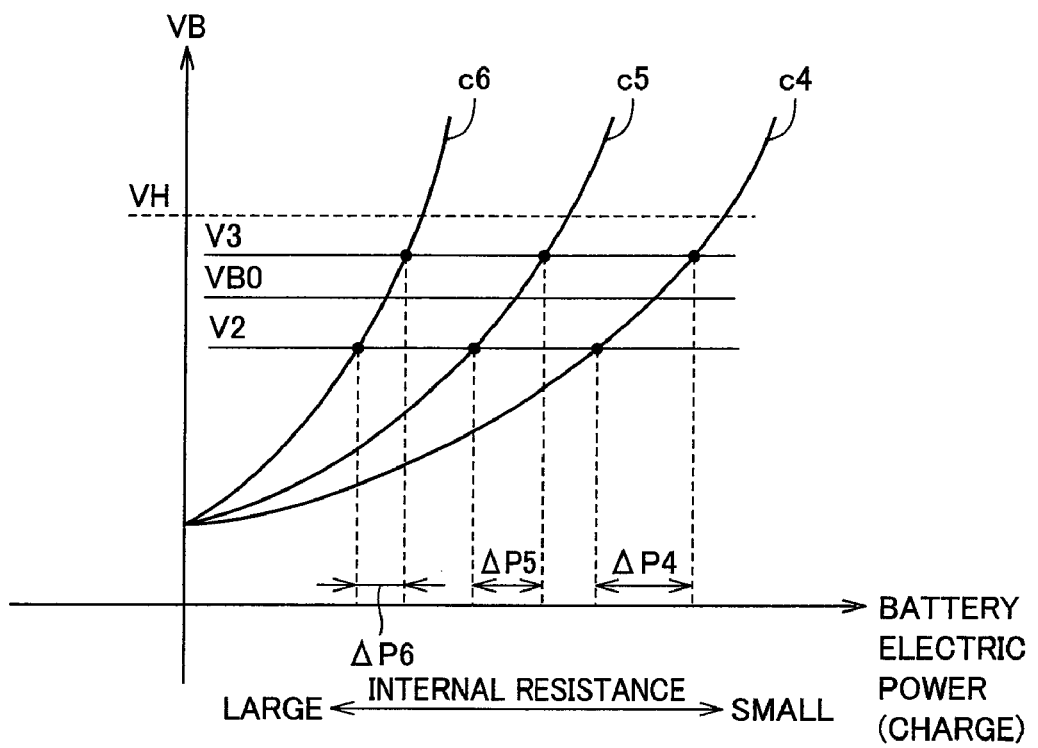
FIG. 9 is a diagram for illustrating a relationship between charged electric power of battery 12 and battery voltage VB.

FIG. 9 is a diagram for illustrating a relationship between charged electric power of battery 12 and battery voltage VB.

With reference to FIG. 9, curves c4 to c6 are curves showing the relationship between the electric power of battery 12 at the time of electric charge and battery voltage VB. Curves c4 and c6 show the relationship between the charged electric power of battery 12 and battery voltage VB in a state where the internal resistance of the battery is relatively low and in a state where the internal resistance of the battery is relatively high respectively. Curve c5 shows the relationship between the charged electric power of battery 12 and battery voltage VB in a middle state between the state where the internal resistance of the battery is relatively low and the state where the internal resistance of the battery is relatively high.

In any of curves c4 to c6, as the charged electric power is increased, battery voltage VB is increased. At the time of charging battery 12, as the internal resistance of battery 12 is raised, a change ratio of battery voltage VB relative to the change in the charged electric power is increased.

Voltage VH is an upper limit value of battery voltage VB determined based on, for example, the performance of the battery, the use state (deterioration state) of the battery or the like. By maintaining battery voltage VB lower than voltage VH, for example, over-charge of the battery can be prevented. ΔP4, ΔP5 and ΔP6 show change amounts of the charged electric power when battery voltage VB is changed from voltage V2 to voltage V3 in curves c4 to c6, respectively. It should be noted that target voltage VB0 is between voltage V2 and voltage V3.

In a case where the internal resistance is small, that is, in a case where the battery temperature is high, the feedback gain in PI control unit 123 of FIG. 2 is set to be large. On the other hand, in a case where the internal resistance is high, that is, in a case where the battery temperature is low, the feedback gain in PI control unit 123 is set to be small.

In a case where the battery temperature is high, the feedback gain is increased. Therefore, the compensation amount of limit value Win is increased. As a result, the change in the charged electric power is increased. Therefore, even when the change in battery voltage VB is small, the response property of input/output control system 114 can be enhanced. On the other hand, in a case where the battery temperature is low, the change in battery voltage VB relative to the change in the outputted electric power of the battery is increased but the feedback gain is decreased. In this case, since the compensation amount of limit value Win is decreased, the change in limit value Win relative to the change in battery voltage VB can be decreased. Thereby, the overshoot, the undershoot, the hunting and the like of battery voltage VB can be prevented.

That is, as well as a case where the electric power is taken out from battery 12, in a case where battery 12 is charged, the fluctuation of battery voltage VB relative to the electric power inputted to the battery can be suppressed (battery voltage VB can be brought closer to target voltage VB0) not in accordance with the battery temperature.

As a result, the electric power to be inputted to the battery can be controlled so that the upper limit value of battery voltage VB (voltage V3) is lower than voltage VH. In such a way, according to the present embodiment, the voltage of the battery can be properly controlled in accordance with the battery temperature.

It should be noted that in the present embodiment, a flowchart showing processing in a case where battery 12 is charged is the same as the flowchart shown in FIG. 8. Therefore, description thereof will not be repeated.

With reference to FIG. 1, the input/output controller for the secondary battery in the present embodiment will be comprehensively described. The input/output controller for the secondary battery is provided with temperature sensor 24 detecting the battery temperature of battery 12 (temperature T), voltage sensor 26 detecting the battery voltage of battery 12 (battery voltage VB), and control unit 14 receiving temperature T detected by temperature sensor 24 and battery voltage VB detected by voltage sensor 26 and setting the limit value (Win/Wout) to be inputted to or outputted from battery 12. Control unit 14 changes the change ratio of the limit value relative to battery voltage VB in accordance with temperature T.

With reference to FIG. 2, preferably, control unit 14 includes the operation unit (PI control unit 123) performing control operation based on the deviation between target voltage VB0 of battery 12 and battery voltage VB. PI control unit 123 changes the control gain used for the control operation in accordance with temperature T. Control unit 14 further includes initial value setting unit 124 setting the initial value (Win0/Wout0) of the limit value, and final value determining unit 125 determining the limit value (Win/Wout) based on the initial value of the limit value and the operation result of PI control unit 123.

More preferably, PI control unit 123 determines the control gain so that the control gain is decreased as temperature T is lowered.

With reference to FIG. 3, more preferably, the control operation of the operation unit (PI control unit 123) is the proportional integral operation. The control gain includes the proportional gain and the integral gain. PI control unit 123 has coefficient setting unit 134, proportional operation unit 131, integral operation unit 132, and adding unit 135. Proportional operation unit 131 sets coefficients kP(T) and kI(T) (first and second coefficients) in accordance with temperature T. Proportional operation unit 131 sets the proportional gain by multiplying coefficient kP(T) by fixed gain kPD not in accordance with temperature T and operates the proportional value of the deviation with using the proportional gain. Integral operation unit 132 sets the integral gain by multiplying coefficient kI(T) by fixed gain kID not in accordance with temperature T and operates the integral value of the deviation with using the integral gain. Adding unit 135 adds the proportional value and the integral value.

In such a way, in the present embodiment, the voltage of the battery can be properly controlled in accordance with the battery temperature. Therefore, an electric storage performance and a discharge performance of the battery can be sufficiently exhibited.

According to the present embodiment, hybrid vehicle 1 is provided with the input/output controller for the secondary battery described in any of the above descriptions and battery 12. Since the electric storage performance and the discharge performance of the battery can be sufficiently exhibited by the input/output controller, a performance of the vehicle can be sufficiently exhibited.

It should be noted that the above descriptions show an example that the input/output controller for the secondary battery of the present embodiment is applied to a series/parallel type hybrid system capable of dividing and transmitting the mechanical power of the engine into a wheel axle and a generator by a power split device. However, the present invention can be also applied to a series type hybrid vehicle of using an engine only for driving a generator and generating drive force of a wheel axle only by a motor using electric power generated by the generator or an electric vehicle traveling only by a motor.

The embodiment disclosed here is only an example in all respects but not restrictive. The scope of the present invention is shown not by the above descriptions but the claims and all the modifications within similar meanings and ranges of the claims are to be included.

The invention claimed is:
1. An input/output controller for a secondary battery, comprising:
 a temperature detecting unit detecting a battery temperature of said secondary battery;
 a voltage detecting unit detecting battery voltage of said secondary battery; and a setting unit programmed to receive said battery temperature detected by said temperature detecting unit and said battery voltage detected by said voltage detecting unit and to set a limit value of electrical power to be inputted to or outputted from the secondary battery, said setting unit being programmed to change a change ratio of said limit value relative to said battery voltage in accordance with said battery temperature.

2. The input/output controller for the secondary battery according to claim 1, wherein:

said setting unit includes an operation unit performing control operation based on a deviation between target voltage of said secondary battery and said battery voltage, said operation unit changes control gain used for said control operation in accordance with said battery temperature, and said setting unit further includes:

an initial value setting unit setting an initial value of said limit value; and a limit value determining unit determining said limit value based on said initial value and an operation result of said operation unit.

3. The input/output controller for the secondary battery according to claim 2, wherein said operation unit determines said control gain so that said control gain is decreased as said battery temperature is lowered.

4. The input/output controller for the secondary battery according to claim 2, wherein said control operation is proportional integral operation, said control gain includes proportional gain and integral gain, and said operation unit has:

a coefficient setting unit setting first and second coefficients in accordance with said battery temperature;

a proportional operation unit setting said proportional gain by multiplying said first coefficient by fixed first gain irrespective of said battery temperature and operating a proportional value of said deviation with using said proportional gain;

an integral operation unit setting said integral gain by multiplying said second coefficient by fixed second gain irrespective of said battery temperature and operating an integral value of said deviation with using said integral gain; and an adding unit adding said proportional value and said integral value.

5. A vehicle, comprising:

a secondary battery; and an input/output controller for controlling an input and an output of said secondary battery, including a temperature detecting unit detecting a battery temperature of said secondary battery;

a voltage detecting unit detecting battery voltage of said secondary battery; and a setting unit programmed to receive said battery temperature detected by said temperature detecting unit and said battery voltage detected by said voltage detecting unit and to set a limit value of electrical power to be inputted to or outputted from the secondary battery, said setting unit being programmed to change a change ratio of said limit value relative to said battery voltage in accordance with said battery temperature.

6. The vehicle according to claim 5, wherein said setting unit has an operation unit performing control operation based on a deviation between target voltage of said secondary battery and said battery voltage, said operation unit changes control gain used for said control operation in accordance with said battery temperature, and said setting unit further has:

an initial value setting unit setting an initial value of said limit value; and a limit value determining unit determining said limit value based on said initial value and an operation result of said operation unit.

7. The vehicle according to claim 6, wherein said operation unit determines said control gain so that said control gain is decreased as said battery temperature is lowered.

8. The vehicle according to claim 6, wherein said control operation is proportional integral operation, said control gain includes proportional gain and integral gain, and said operation unit has:

a coefficient setting unit setting first and second coefficients in accordance with said battery temperature;

a proportional operation unit setting said proportional gain by multiplying said first coefficient by fixed first gain irrespective of said battery temperature and operating a proportional value of said deviation with using said proportional gain;

an integral operation unit setting said integral gain by multiplying said second coefficient by fixed second gain irrespective of said battery temperature and operating an integral value of said deviation with using said integral gain; and an adding unit adding said proportional value and said integral value.

* * * * *